(12) United States Patent
Werjefelt (10) Patent No.: US 8,573,514 B1
(45) Date of Patent: Nov. 5, 2013

(54) SMOKE EVACUATION DEVICE (76) Inventor: Bertil R. L. Werjefelt, Kaneohe, HI (US)

( * ) Notice: Subject to any disclaimer, the term of this patent is extended or adjusted under 35 U.S.C. 154(b) by 610 days.

(21) Appl. No.: 10/656,792

(22) Filed: Sep. 8, 2003

Related U.S. Application Data (63) Continuation of application No. 10/189,574, filed on Jul. 8, 2002, now Pat. No. 6,645,064, which is a continuation of application No. 09/285,013, filed on Apr. 1, 1999, now abandoned.

(60) Provisional application No. 60/083,621, filed on Apr. 30, 1998.

(51) Int. Cl.
*A62C 2/08* (2006.01)

(52) U.S. Cl.
USPC .................................. 239/548; 239/553.3

(58) Field of Classification Search
USPC ........ 239/1, 270, 548, 553.3, 41, 42, 43, 589, 239/590.3; 169/62–65, 66; 454/76, 189; 244/118.5, 121
See application file for complete search history.

(56) References Cited

U.S. PATENT DOCUMENTS

| | | | |
|---|---|---|---|
| 354,658 A | 12/1886 | Runge et al. | |
| 903,788 A * | 11/1908 | Schmidt | 169/41 |
| 1,192,857 A | 9/1916 | Caldwell et al. | |
| 1,646,102 A | 10/1927 | Patrick | |
| 1,974,828 A | 9/1934 | Markut | |
| 2,032,101 A | 2/1936 | Sullivan | |
| 2,099,464 A | 11/1937 | Bruner et al. | |
| 2,144,631 A | 1/1939 | Kurth | |
| 2,444,393 A | 6/1948 | Woo | |
| 2,571,726 A | 10/1951 | Koch | |
| 2,618,215 A | 11/1952 | Fitt | |
| 2,818,859 A | 1/1958 | Peterson | |
| 2,844,825 A | 7/1958 | Gauerke | |
| 2,946,345 A | 7/1960 | Weltmer | |
| 3,444,799 A | 5/1969 | Covington | |
| 3,814,001 A * | 6/1974 | Hill | 454/154 |
| 3,921,223 A | 11/1975 | Hoyecki | |
| 4,031,171 A * | 6/1977 | Asao et al. | 261/1 |
| 4,054,084 A * | 10/1977 | Palmer | 454/342 |
| 4,320,696 A * | 3/1982 | Daniels et al. | 454/323 |
| 4,353,292 A | 10/1982 | Alamasi et al. | |
| 4,510,191 A * | 4/1985 | Kagami et al. | 428/34.4 |
| 4,623,367 A | 11/1986 | Paulson | |
| 4,832,287 A | 5/1989 | Werjefelt | |
| 4,848,669 A * | 7/1989 | George | 239/539 |
| 4,884,497 A | 12/1989 | Dosmann | |
| 4,967,320 A | 10/1990 | Paschal | |
| 5,002,049 A | 3/1991 | Knoll | |
| 5,197,548 A * | 3/1993 | Volker et al. | 169/11 |

(Continued)

FOREIGN PATENT DOCUMENTS

| | | |
|---|---|---|
| DE | 150148 | 8/1981 |
| RU | 558674 | 5/1975 |

*Primary Examiner* — Davis Hwu
(74) *Attorney, Agent, or Firm* — Shlesinger, Arkwright & Garvey LLP (57) ABSTRACT

A smoke evacuation device comprises a nozzle for connection to a source of clean air supply, the nozzle being adapted to vent clean air supply in all available directions in space therefrom to provide a volume of space with clean air in the proximity of the nozzle, thereby providing visibility and breathable air to the user. The nozzle is adapted to minimize entrainment of the surrounding smoke into the volume.

5 Claims, 7 Drawing Sheets

(56) References Cited

U.S. PATENT DOCUMENTS

| | | |
|---|---|---|
| 5,202,796 A | 4/1993 | Werjefelt |
| 5,240,478 A | 8/1993 | Messina |
| 5,290,331 A | 3/1994 | Miles et al. |
| 5,389,037 A | 2/1995 | Hale |
| 5,399,319 A | 3/1995 | Schoenberger et al. |
| 5,411,372 A | 5/1995 | Clark |
| 5,484,472 A | 1/1996 | Weinberg |
| 5,607,354 A | 3/1997 | Mill et al. |
| 5,947,813 A * | 9/1999 | Chow et al. ............ 454/155 |
| 6,082,673 A | 7/2000 | Werjefelt |
| 6,645,064 B1 * | 11/2003 | Werjefelt ................ 454/76 |

\* cited by examiner

SMOKE EVACUATION DEVICE

RELATED APPLICATIONS

This is a continuation of application Ser. No. 10/189,574, filed Jul. 8, 2002 now U.S. Pat. No. 6,645,064, which is a continuation of application Ser. No. 09/285,013, filed Apr. 1, 1999 now abandoned, which claims the priority benefit of provisional application Ser. No. 60/083,621, filed Apr. 30, 1998, the disclosures of which are hereby incorporated by reference.

BACKGROUND OF THE INVENTION

Various devices to dilute or otherwise protect against smoke have over the years been proposed and are documented in the patent literature. However, it appears the inventors were not cognizant of the venturi effect which tends to entrain surrounding gas and thereby rendering the various proposed inventions non functioning or very inefficient for their intended purpose. This is also evidenced in the current technology in use particularly in aircraft cockpit for smoke evacuation purposes where dilution by outside air is the means of attempting to cope with dense continuous smoke in the cockpit window in severe circumstances. Neither of these procedures work to eliminate a continuous dense smoke problem in the cockpit. Opening the window has little or no effect because of the aerodynamics surrounding the fuselage where the windows are located and the small controllable air nozzles merely entrain the surrounding smoke and mix it with the airstream thereby having little or no effect during emergencies where the smoke cannot be stopped.

The present invention overcomes these fundamental deficiencies and in addition provides added advantages as disclosed below.

It is noteworthy to observe that the problem of dense vision impairing smoke is particularity acute in aircraft and there is a long history of smoke accidents where pilots have been unable to see to safely control and land the aircraft. Likewise, although the historical record may not be as catastrophic as in the aviation industry, a similar problem exists on submarines where operators need to be able to see to turn off reactors and otherwise manipulate controls read instruments to control a fire/smoke emergency. U.S. Pat. No. 4,832,287 issued to Werjefelt addresses this safety dilemma and does provide vision for pilots and other operators regardless of smoke density. However, depending on what criteria may be applied, the present invention may prove to be a substantial improvement in that it solves the problem in a quite different way with less cumbersome paraphernalia for the users to contend with. While it may not provide as guaranteed a protection of vision as that described in the Werjefelt patent, it may in certain applications provide a very satisfactory level of safety for the purpose of pilot or other operator vision assurance.

OBJECTS AND SUMMARY OF THE INVENTION

It is an object of the present invention to provide means by which to evacuate smoke from a desired area for the purpose of obtaining visibility, which otherwise would be impaired by the presence of dense continuous smoke in an enclosed space.

It is another object of the present invention to provide a device that when connected to an appropriate supply of breathable air, while also providing visibility, will at the same time provide a respirable environment in the area from which smoke is being evacuated by the device.

It is still another object of the present invention to replace goggles which are used to protect the eyes from the lacrimatory effects of smoke and toxic gases and fumes while at the same time also replacing a gas mask or smoke hood or oxygen mask which is the present means of protecting respiration of people who are confined in an enclosed area where smoke and lethal fumes may be present in an emergency.

It is another object of the present invention to replace or improve upon recent technological advances designed to ensure vision of instruments and controls for operators in enclosed areas where dense smoke may otherwise severely or completely inhibit such vision.

The invention can be in the form of a small portable device or it can be built into a structure as a fixed stationary device system. The device may incorporate compressed gas supplies, filtering means or external air/gas supplies as suitable for the protection means for providing protection against decompression for airline passengers and crew without the need for the conventional "little yellow cup" commonly found on jet liners to provide supplementary oxygen for passengers in the event of decompression. Again the invention, regardless of its intended function i.e for visibility, for protective breathing for eye protection or for decompression protection can be in the form of a small portable installation/system incorporating gaseous generating sources and/or fixed pipes or hoses to provide appropriately pressurized supplies of air or oxygen.

Moreover, the invention also has applications underwater for the purpose of aiding divers doing underwater work in murky waters, where it can be used to evacuate or displace the murky water to provide clear visibility for divers.

In summary, the present invention provides a smoke evacuation device comprising a nozzle for connection to a source of clean air supply, the nozzle being adapted to vent clean air supply in all available directions in space therefrom to provide a volume of space with clean air in the proximity of the nozzle, thereby providing visibility and breathable air to the user. The nozzle is adapted to minimize entrainment of the surrounding smoke into the volume.

The present invention further provides a protective breathing device, comprising a source of breathable gas; a nozzle for connection to the source of breathable gas, the nozzle being adapted to vent the gas in all available directions in space therefrom to provide a volume of the breathable gas and clear visibility in the proximity of the nozzle; and the nozzle is adapted to minimize entrainment of the surrounding smoke into the volume.

The present invention still provides a device for providing supplementary oxygen for protection against decompression, comprising a source of oxygen; and a nozzle for connection to the source of oxygen, the nozzle being adapted to vent the oxygen in all available directions in space therefrom to provide a volume of oxygen and clear visibility in the proximity of the nozzle.

The present invention also provides a device for providing visibility for divers, comprising a nozzle for connection to a source of clear water supply, the nozzle being adapted to vent the clear water supply in all available directions in space therefrom to provide a volume of space with clear water in the proximity of the nozzle, thereby providing visibility to the user; and the nozzle is adapted to minimize entrainment of the surrounding murky water into the volume.

The present invention further provides a device for providing clean air in a desired volume/area free of contaminants, comprising a nozzle for connection to a source of clean air supply, the nozzle being adapted to vent the clean air supply in all available directions in space therefrom to provide a volume/area free of contaminants in the proximity of the nozzle; and the nozzle is adapted to minimize entrainment of the surrounding contaminated air into the volume/area.

The present invention also provides a device for providing a desired gas in a certain volume/area, comprising a nozzle for connection to a source of desired gas, the nozzle being adapted to vent the desired gas in all available directions in space therefrom to provide a volume/area containing the gas in the proximity of the nozzle; and the nozzle is adapted to minimize entrainment of the surrounding air into the volume/area.

These and other objects of the present invention will become apparent from the following detailed description.

DETAILED DESCRIPTION OF THE INVENTION

The essence of the present invention rests in the function of the "nozzle(s)" in that the gaseous flow from the nozzle used to evacuate the smoke outside of the nozzle is so designed that the flow of gas is "omnidirectional" in all possible directions from the nozzle to the surrounding space. By providing an omnidirectional flow, one is able to overcome the deficiencies of the prior art, namely, the entrainment of the surrounding smoke into the airstream which is used for smoke evacuation or smoke displacement purposes. It will be readily apparent to anybody reasonably versed in the art that the omnidirectional flow can be accomplished by many different means, such as, but not limited to, appropriately designed holes, slits, baffles, sintered/porous materials and/or otherwise permeable materials depending on flow rate, pressures involved of the gas supply, etc.

For instance, a sintered material may be suitable to use where very high gas supply pressures are used. The sintered material would then function to release the gas in appropriate directions and at an appropriate rate to accomplish the intended function. Thus, this invention specifically provides for means to eliminate the long-standing problem of entrainment of a surrounding gas (smoke), thereby allowing a certain volume within an enclosed area to be free of undesirable gas, i.e., toxic smoke, lethal fumes and vision impairing contaminants or, in the case of underwater applications, murky water. Moreover, the invention can also provide for clean air in contaminated environments, for example, in operating rooms, where it is desirable to have a clean volume of air, free of microbes and the like, in the immediate area surrounding an incision. Or, likewise, it can be used to provide a clean breathing environment for persons where the environment is otherwise contaminated by microbes, virus or the like. The invention can also be useful in ordinary environments, for instance, where smoking is permitted, but non-smokers in the same area would like to have fresh air surrounding them.

By way of simple description, an "omnidirectional" nozzle placed at the end of a pipe or hose would, therefore, have a flow in a spherical direction inclusive of the direction down towards and along the pipe or hose feeding the omnidirectional nozzle. The flow along the pipe or hose is critical in order to eliminate entrainment.

In the case where an omnidirectional nozzle is used on a flat surface, for instance, an instrument panel in a cockpit, the flow would be that of half a sphere. In other words, an omnidirectional nozzle placed in the corner of an enclosure, i.e., in the corner between two walls and ceiling in a room, the flow therefrom would be that of a quarter of intervening space. Thus, in all these cases, eliminating entrainment into the airstream is used for smoke evacuation or dilution of the surrounding gas. At some point, entrainment will occur and there will be a limit to the extent of the effective outward flow from the nozzle, after which mixing and entrainment will occur.

Various exemplary configurations are shown in FIGS. 1 through 10.

Figure 1:
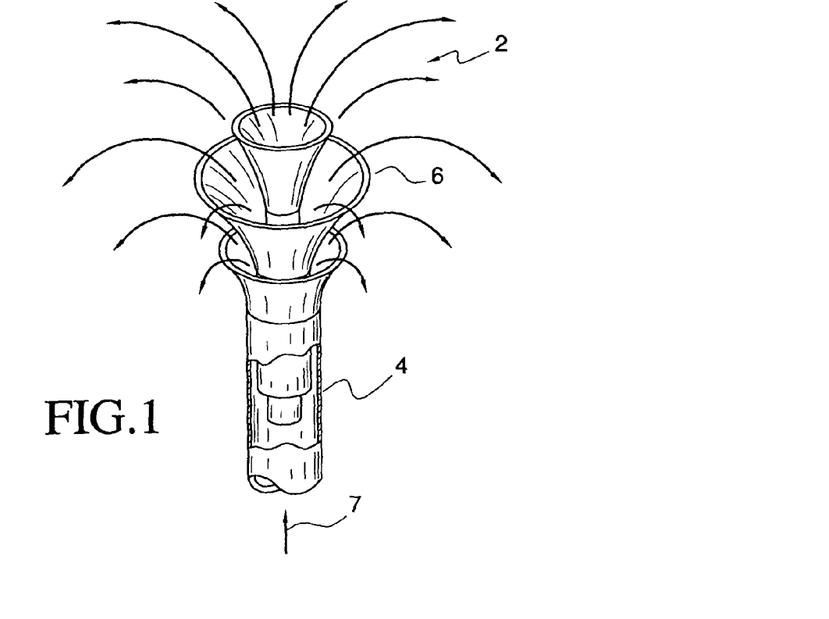
FIG. 1 is a perspective view, with portions in cross-section, of an omnidirectional nozzle made in accordance with the present invention.

FIG. 1 shows an omnidirectional nozzle 2 attached to the end of a hose or pipe 4. The omnidirectional nozzle 2 comprises a number of baffles or vents 6 to conduct the airflow in an omnidirectional way, that is, in all available directions, including downward flow along the pipe, thereby pushing contaminated air outwardly to provide a clean sphere or zone of air around the nozzle. Inflow of clean air is indicated by the arrow 7.

Figure 2:
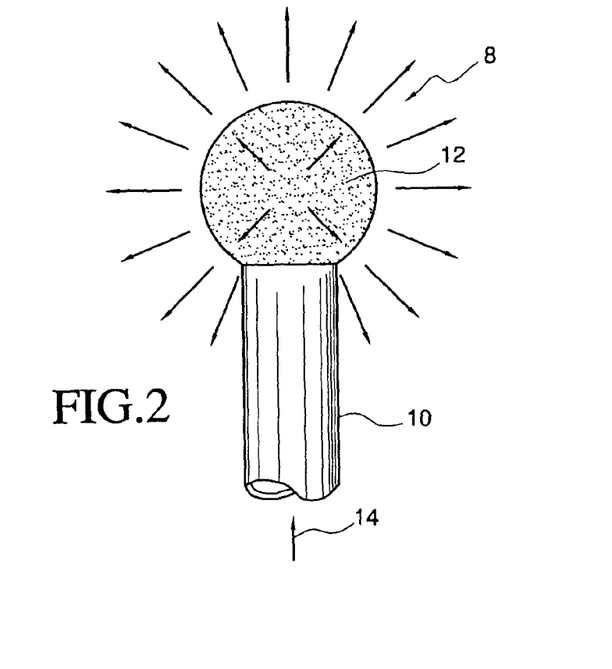
FIG. 2 is a side elevational view of another embodiment of an omnidirectional nozzle made in accordance with the present invention.

FIG. 2 discloses an omnidirectional nozzle 8 in the shape of a sphere attached to the end of a hose or a pipe 10. The means of outflow from the spherical nozzle is by holes 12 or slits formed in the sphere. The sphere itself may be made of porous or sintered material or the like, thereby providing a multitude of openings to generate the required omnidirectional flow. Inflow of clean air is indicated by the arrow 14.

Figure 3:
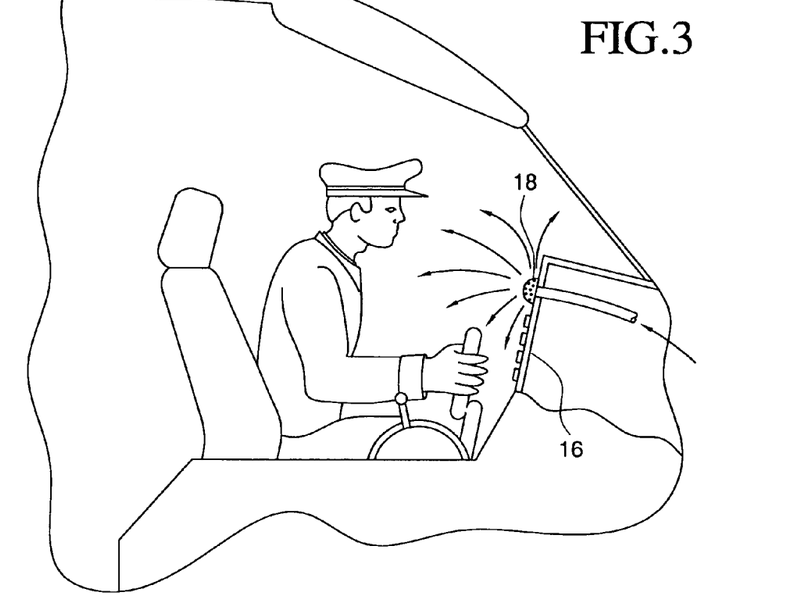
FIG. 3 is a schematic view showing an omnidirectional nozzle placed on an instrument panel.

FIG. 3 shows an omnidirectional nozzle placed on an instrument panel 16 whereby the flow is generally from the center of a half-sphere 18 outwardly in all directions. The omnidirectional airflow displaces particulate laden air in the vicinity of the nozzle, thereby providing clear area for visibility around the instrument panel.

Figure 4:
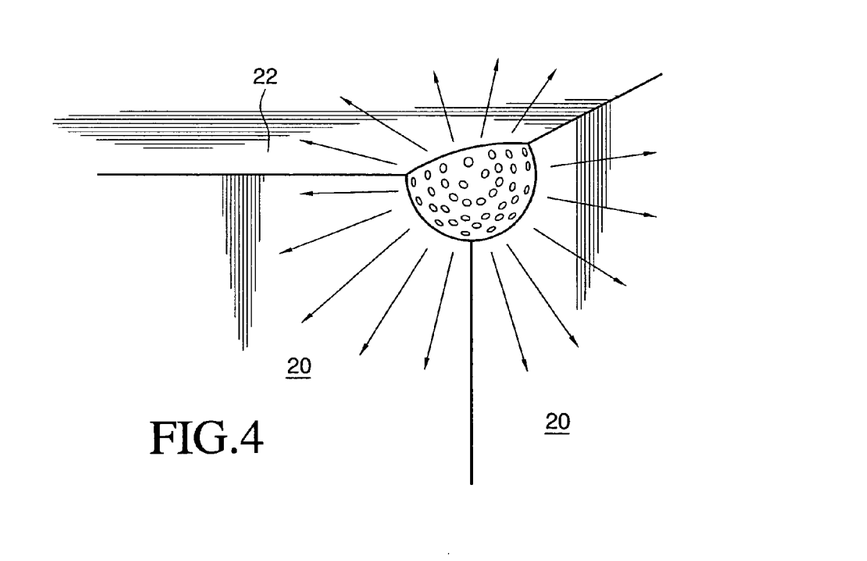
FIG. 4 is a perspective view of an omnidirectional nozzle placed in a corner formed by two walls and a ceiling.

FIG. 4 discloses an omnidirectional nozzle placed in a corner, such as one formed by two walls 20 and a ceiling 22. From the center of the flow, generally an eighth of a sphere, will constitute the omnidirectional flow in all available directions.

Figure 5A:
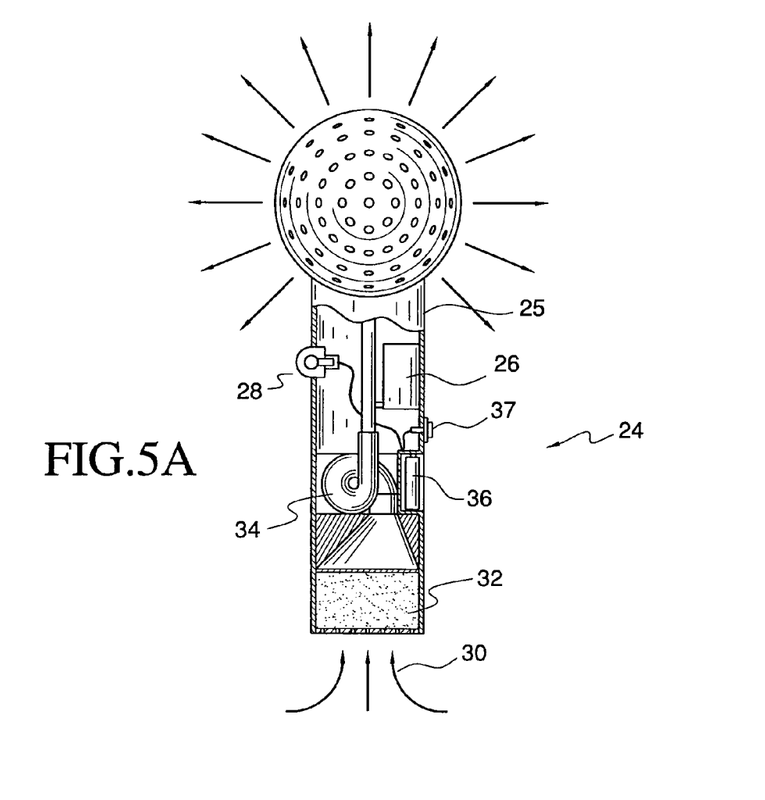
FIG. 5A is a side elevational view, with portions broken away and shown in cross-section, of a handheld embodiment of the present invention.

FIG. 5A shows a hand held embodiment 24 of the invention which can include an optional oxygen source 26 and an optional light 28 for emergency illumination. The device 24 includes a housing 25 that is held in an upright position, in essence as a candle would be held, thereby providing a sphere of clean air in the proximity of the person carrying the device. Ambient air 30 is filtered through the device by means of filter 32 to provide a clear zone around the nozzle. A fan 34 operated by batteries 36 forces ambient air through the filter 32. The oxygen source 26 is operably connected to the nozzle and is used for breathing. A switch 37 is operably connected to the batteries 36 to control the operation of the fan 34 and the light 28.

Figure 5B:
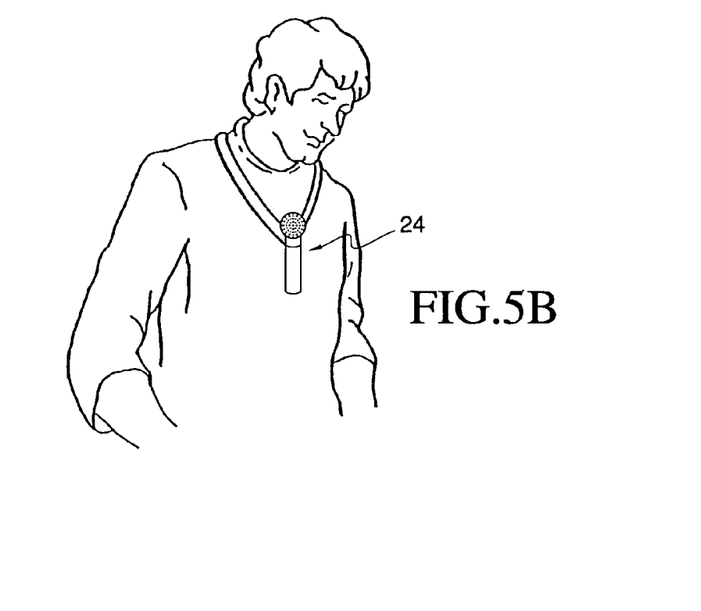
FIG. 5B shows the embodiment of FIG. 5A hung as a pendant around the neck of a user.

FIG. 5B discloses the use or deployment of the device 24 described in FIG. 5A, wherein the device is hung in essence like a pendant around the neck of a user to provide a clear zone of visibility and breathable air around the user's face.

Figures 5C, 6:
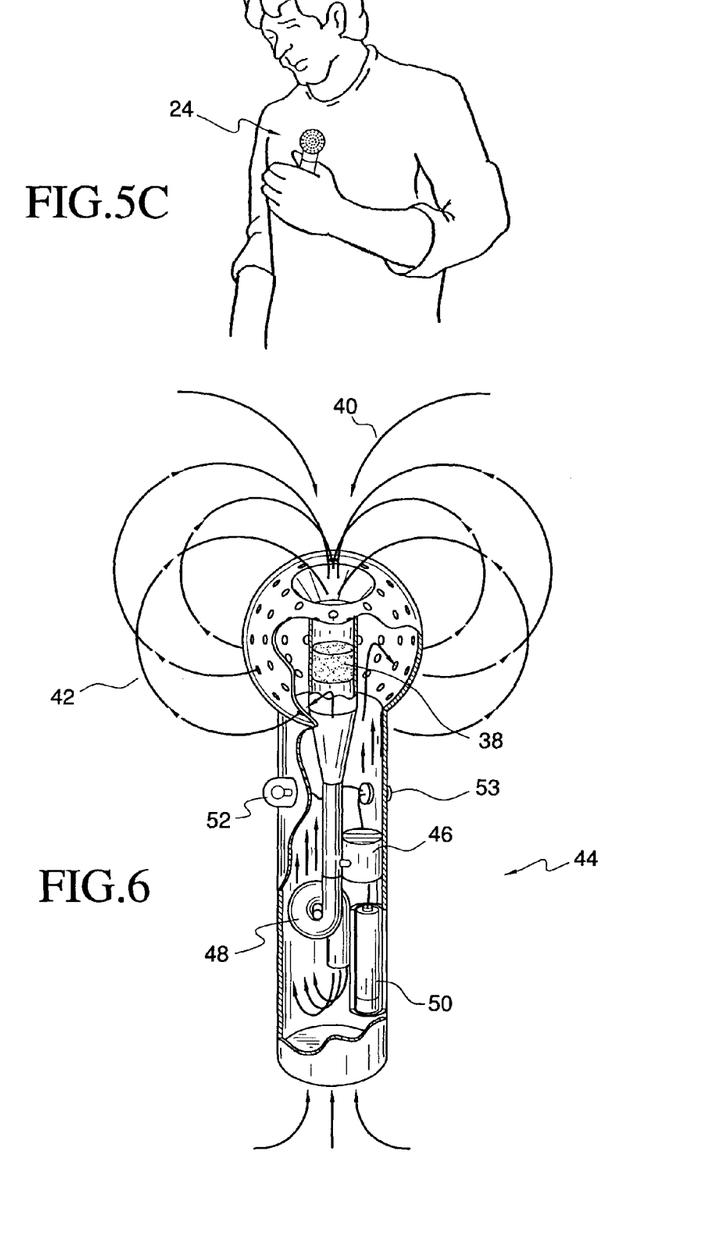
FIG. 5C shows the embodiment of FIG. 5A as it is carried around in the user's hand near his face.
FIG. 6 is a perspective view, with portions shown in cross-section, showing another handheld embodiment of the present invention.

FIG. 5C shows the device 24 of FIG. 5A as it is carried around in the user's hand near his face to provide a zone of clear air for visibility and breathable air.

FIG. 6 shows the use of a filter 38 in the nozzle area or in the area where clean air is exhausted. The inflow 40 to the filter 38 is taken from the outflow 42 from the nozzle, thus diminishing the stress on the filter by contaminants. The device 44 shows a partial recirculation of the air that has been previously filtered by the device. An optional oxygen source 46 may be provided in case the oxygen in ambient atmosphere is low. A fan 48 powered by batteries 50 draw the airflow through the filter and the nozzle. An optional filter may be disposed within the housing in series with the airflow to provide additional filtering capacity for the device. A light is provided to provide emergency illumination. A switch controls the operation of the fan 48 and the light 52.

Figure 7:
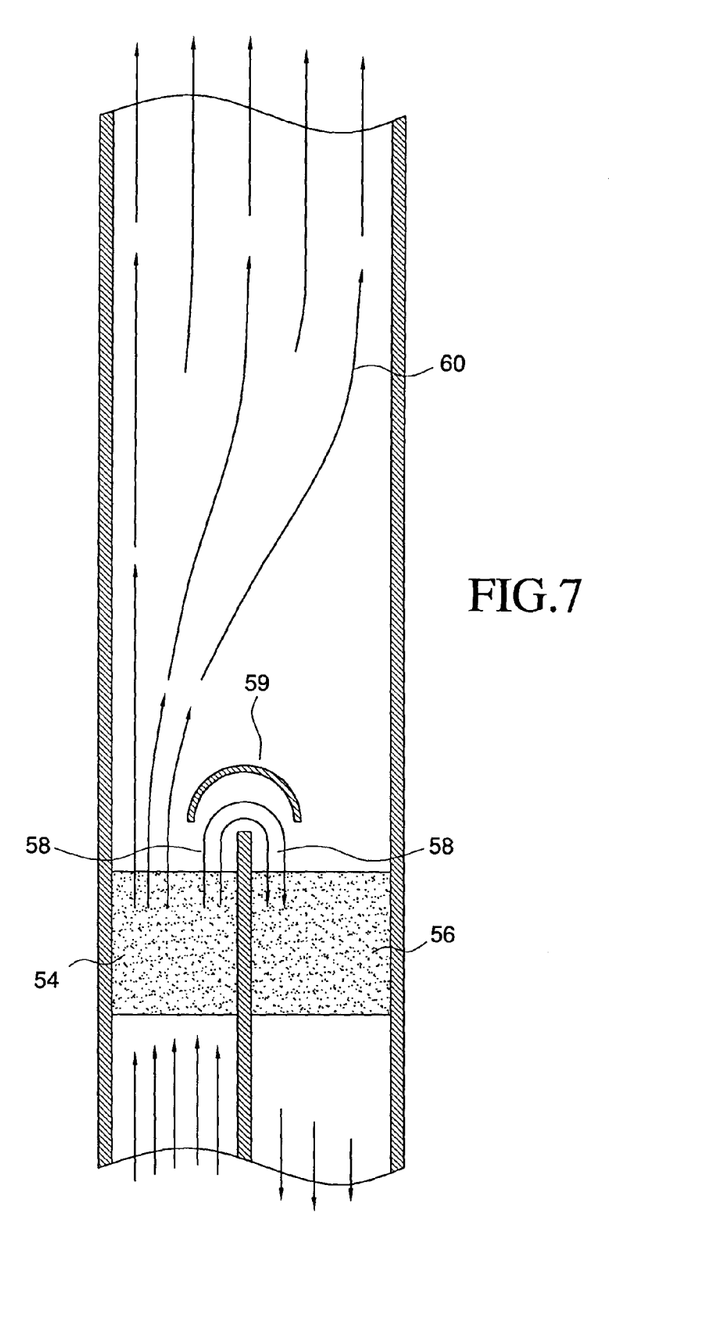
FIG. 7 is a fragmentary cross-sectional view showing an arrangement of filters used in the present invention.

FIG. 7 shows an arrangement of filters 54 and 56 within the device for extended or efficient use. Part of the filtered air 58 from one filter, such as filter 54, is diverted by a diverter 59 to backflush the other filter 56, or vice versa. The rest of the filtered air is allowed to exit through the nozzle.

Figure 8:
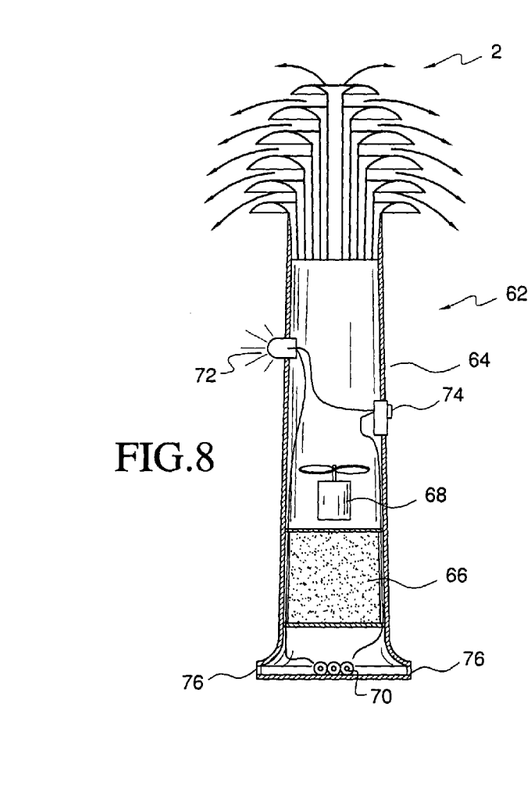
FIG. 8 is a schematic cross-sectional view of another portable handheld embodiment of the present invention.

FIG. 8 is schematic view of the device in a portable hand held embodiment 62, using an omnidirectional nozzle similar to that of FIG. 1. The device 62 comprises a housing 64 in the shape of a trunk, an onmidirectional nozzle 2 secured to one end of the housing 64, a filter 66 disposed at the other end of the housing, a fan 68 powered by batteries 70, a light 72 operably connected to the batteries 70, and a switch 74 operably connected to the fan 68, light 72 and the batteries 70. Ambient airflow is through openings 76 at the bottom of the housing 64.

Figure 9:
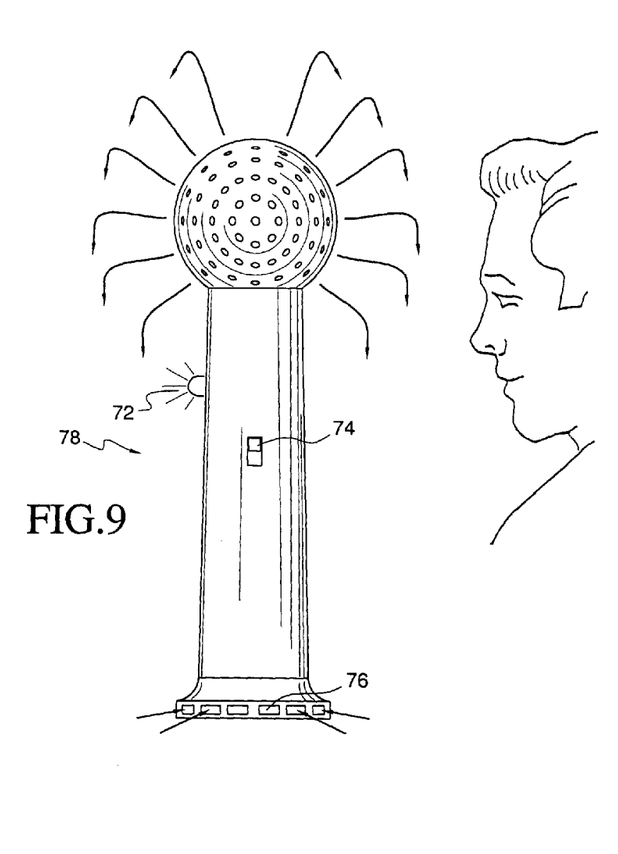
FIG. 9 is a side elevational view of another embodiment of the present invention.

FIG. 9 shows another embodiment 78 of the device of FIG. 8, using a different omnidirectional nozzle 8 similar to FIG. 2. The other components of the device 78 are similar to those of the device 62. Airflow is through openings 76.

Figure 10:
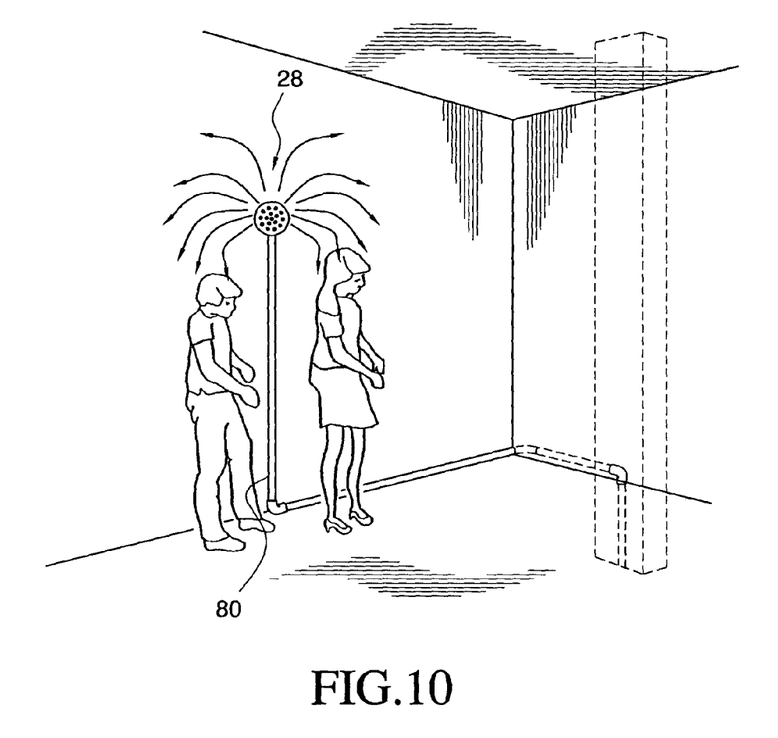
FIG. 10 is a schematic diagram showing a nozzle of the present invention disposed within a room and connected to a pipe that brings in outside clean air into the room during a smoke event.

FIG. 10 discloses an installation using the present invention, where the omnidirectional nozzle 2 or 8 is connected to a pipe 80 that brings in outside clean air into a room during a smoke event.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A device disposed in a room for supplying breathable air in said room during a smoke emergency, comprising:
   a) a nozzle for connection to a source of breathable air supply, said nozzle being adapted to vent the breathable air supply in all available spherical directions in space therefrom to provide a volume of space with the breathable air in the proximity of said nozzle, thereby providing breathable air to the user;
   b) said nozzle is porous having a multitude of openings configured to generate omnidirectional flow simultaneously in all available spherical directions; and
   c) said nozzle is within said room to provide a volume of said breathable air in the proximity of said nozzle to an occupant of said room.

2. A device as in claim 1, wherein said nozzle is disposed above the occupant's head.

3. A device as in claim 1, wherein said nozzle is adapted to minimize entrainment of the surrounding smoke into said volume.

4. A device as in claim 1, wherein said nozzle is made of sintered material having said multitude of openings to generate said omnidirectional flow.

5. A device for providing clean air in a desired volume, comprising:
   a) a nozzle for connection to a source of clean air supply, said nozzle being adapted to vent the clean air supply in all available spherical directions in space therefrom to provide a volume of space with clean air in the proximity of said nozzle; and
   b) said nozzle is porous having a multitude of openings configured to generate omnidirectional flow simultaneously in all available spherical directions.

* * * * *